(12) United States Patent
Kwon

(10) Patent No.: US 10,547,878 B2
(45) Date of Patent: Jan. 28, 2020

(54) HYBRID TRANSMISSION PROTOCOL

(71) Applicant: ERmind CO., LTD, Seoul (KR)

(72) Inventor: Young Min Kwon, Seoul (KR)

(73) Assignee: ERMIND CO., LTD, Seoul (KR)

( * ) Notice: Subject to any disclaimer, the term of this patent is extended or adjusted under 35 U.S.C. 154(b) by 270 days.

(21) Appl. No.: 15/537,380

(22) PCT Filed: Dec. 18, 2015

(86) PCT No.: PCT/KR2015/013909
§ 371 (c)(1),
(2) Date: Oct. 31, 2017

(87) PCT Pub. No.: WO2016/099183
PCT Pub. Date: Jun. 23, 2016

(65) Prior Publication Data
US 2019/0158898 A1 May 23, 2019

(30) Foreign Application Priority Data
Dec. 18, 2014 (KR) .......................... 10-2014-0183098

(51) Int. Cl.
*H04N 21/2343* (2011.01)
*H04N 21/21* (2011.01)
*H04N 21/61* (2011.01)
*G06F 9/455* (2018.01)

(52) U.S. Cl.
CPC . *H04N 21/234309* (2013.01); *G06F 9/45558* (2013.01); *H04N 21/21* (2013.01); *H04N 21/6125* (2013.01); *G06F 2009/45595* (2013.01)

(58) Field of Classification Search
CPC .......... H04N 21/234309; H04N 21/21; H04N 21/6125; H04N 21/4622; H04N 21/2343; H04N 21/4402; H04N 21/8586; H04N 19/40; H04N 21/2402; H04N 19/146; G06F 9/45558; G06F 2009/45595; H04L 41/024
USPC ........................................................ 725/143
See application file for complete search history.

(56) References Cited

U.S. PATENT DOCUMENTS 7,089,579 B1 * 8/2006 Mao .................... H04N 7/17318
348/E7.071
7,451,475 B1 * 11/2008 Oz ................. H04N 21/234327
375/E7.013
9,178,934 B1 * 11/2015 Kolam ................ H04L 67/2823
(Continued)

FOREIGN PATENT DOCUMENTS

JP        2014-081866 A      5/2014
KR       10-0817582 B1      3/2008
(Continued)

*Primary Examiner* — Cynthia M Fogg

(57) ABSTRACT

Provided is a hybrid protocol which may provide web browsing service even by means of a low-performance set-top box using a virtualization server. The virtualization server separately encodes a region of a target page, the video of the region being reproduced, or transcodes the video concerned and transmits the transcoded video. In addition, the virtualization server captures a region, on which web data is displayed, as an image file and transmits the image file to the set top box. The set top box reproduces the video using a hardware decoding chip, and restores the target page from the image file using a low-performance CPU.

14 Claims, 11 Drawing Sheets

(56) References Cited

U.S. PATENT DOCUMENTS

| | | | |
|---|---|---|---|
| 2002/0070961 A1* | 6/2002 | Xu | G06F 3/04892 715/738 |
| 2004/0223611 A1* | 11/2004 | Yan | H04N 7/1675 380/37 |
| 2007/0028288 A1* | 2/2007 | Sigmon, Jr. | H04N 7/17318 725/136 |
| 2011/0162027 A1* | 6/2011 | Chen | H04L 12/2834 725/117 |
| 2012/0010995 A1* | 1/2012 | Skirpa | G06F 3/0481 705/14.49 |
| 2013/0160010 A1 | 6/2013 | Park et al. | |
| 2014/0115445 A1 | 4/2014 | Yano | |

FOREIGN PATENT DOCUMENTS

| KR | 10-2010-0023442 A | 3/2010 |
|---|---|---|
| KR | 10-2013-0082685 A | 7/2013 |
| KR | 10-2014-0133096 A | 11/2014 |

* cited by examiner

HYBRID TRANSMISSION PROTOCOL

CROSS REFERENCE TO RELATED APPLICATIONS

This application is a U.S. National Stage of PCT/KR2015/013909, filed Dec. 18, 2015, which claims the priority benefit of Korean Patent Application No. 10-2014-0183098, filed on Dec. 18, 2014, in the Korean Intellectual Property Office, the disclosures of which are incorporated herein by reference.

BACKGROUND OF THE INVENTION

Technical Field

The following exemplary embodiments relate to a protocol in which a virtualization server transmits data to a settop box, and more particularly, to a protocol that encodes, when a moving picture is included within a web page, an area in which the moving picture is reproduced and that transmits the encoded moving picture to a settop box or that downloads and transcodes a moving picture and that transmits the moving picture to a settop box.

Description of Related Art

With the development of a web, several web based platforms and devices that receive the web based platforms are diversified, and with the development of web technology represented with HTML5, high specification hardware is required. Even in an IPTV platform, a demand for web platform reception increases, but due to an IPTV settop box configured with low specification hardware, it is difficult to introduce a web platform.

Because the IPTV settop box configured with low specification hardware is connected to a high speed network and mounts a hardware decoder efficient in image reproduction, thin client technology may be appropriately applied in which a server processes a complex calculation and in which a client simply display. Because the IPTV settop box is connected to a high speed network, high quality image transmission is available, a hardware decoder may be used for multimedia reproduction, which is a weak point of a thin client system and thus the IPTV settop box is more appropriate than a personal computer (PC) when applying thin client technology.

SUMMARY OF THE INVENTION

The following exemplary embodiments optimize a bandwidth between a virtualization server and a settop box.

The following exemplary embodiments provide a web browsing service using a cheap settop box.

In accordance with an exemplary embodiment, a virtualization server includes a parsing unit that parses a target page received from a web server to divide the target page into a moving picture area in which a moving picture is reproduced and a web data area in which web data are displayed; an encoder that captures the moving picture area to re-encode the moving picture when the moving picture is reproduced; a transcoder that downloads the moving picture and that transcodes the downloaded moving picture; a capture unit that captures a web data area to generate an image file; and a transmitting unit that transmits the captured image file and the re-encoded moving picture to the settop box or that transmits the captured image file and the transcoded moving picture to the settop box, wherein the captured image file is restored at the settop box in order to configure a web data area of the target page, the re-encoded moving picture or the transcoded moving picture is restored at the settop box in order to configure a moving picture area of the target page to constitute the target page at the settop box.

Further, the virtualization server may re-encode the moving picture or may download and transcode the moving picture when an uniform resource locator (URL) of the target page is not included in a list of web pages configured with only a moving picture area but when moving picture reproduction information is included in a document object model (DOM) tree of the target page.

Further, the web data area may include a plurality of update areas discontinuously located from each other and updated, compared with a previous time point, and the capture unit may capture one quadrangle area including the entire of the plurality of update areas to generate the image file.

Further, the web data area may include a plurality of update areas discontinuously located from each other and updated, compared with a previous time point, and the capture unit may individually capture quadrangle areas corresponding to each of the discontinuous update areas to generate the image file.

Further, the virtualization server may further include a receiving unit that receives a scroll event about the restored target page from the settop box, wherein when the target page is loaded or when the scroll event is received, the capture unit may capture a web data area.

Further, the transmitting unit may include information about a location and size in the web data area of the captured image file together with the image file in a data packet and transmit the data packet to the settop box.

In accordance with another exemplary embodiment, a settop box includes an image receiving unit that receives an image file generated by capturing a web data area in which web data are displayed in a target page; a moving picture receiving unit that receives a moving picture re-encoded by capturing a moving picture area in which a moving picture is reproduced in the target page or that receives a moving picture generated by transcoding in the virtualization server; and a target page restoration unit that restores the web data area with the image file and that restores the moving picture area with the re-encoded moving picture or the transcoded moving picture to restore the target page.

Further, the image receiving unit may receive a data packet including information about a location and size in the web data area of the captured image file and the image file, and the target page restoration unit may restore the web data area with the received image file with reference to information about a location and size in the web data area of the captured image file.

Further, the web data area may further include a plurality of update areas discontinuously located from each other and updated, compared with a previous time point, and the data packet may include information about a location and size of a plurality of image files generated by individually capturing quadrangle areas corresponding to each of the discontinuous update areas and the plurality of image files.

In accordance with another exemplary embodiment, a method of operating a virtualization server includes parsing a target page received from a web server to divide the target page into a moving picture area in which a moving picture is reproduced and a web data area in which web data are displayed; capturing the moving picture area to re-encode the moving picture or downloading the moving picture to transcode the downloaded moving picture, when the moving picture is reproduced; capturing a web data area to generate an image file; and transmitting the captured image file and the re-encoded moving picture to a settop box or transmitting the captured image file and the transcoded moving picture to a settop box, wherein the captured image file is restored at the settop box in order to configure a web data area of the target page, and the re-encoded moving picture or the transcoded moving picture is restored at the settop box in order to configure a moving picture area of the target page to constitute the target page at the settop box.

Further, the capturing of the moving picture area to re-encode the moving picture or downloading the moving picture to transcode the downloaded moving picture may include re-encoding the moving picture or downloading and transcoding the moving picture when an URL of the target page is not included in a list of web pages configured with only a moving picture area, but when moving picture reproduction information is included in a DOM tree of the target page.

Further, the web data area may include a plurality of update areas discontinuously located from each other and updated, compared with a previous time point, and the capturing of a web data area to generate an image file may include capturing one quadrangle area including the entire of the plurality of update areas to generate the image file.

Further, the web data area may include a plurality of update areas discontinuously located from each other and updated, compared with a previous time point, and the capturing of a web data area to generate an image file may include individually capturing quadrangle areas corresponding to each of the discontinuous update areas to generate the image file.

Further, the method may further include receiving a scroll event of the restored target page from the settop box, wherein the capturing of a web data area to generate an image file may include generating the image file by capturing the web data area when the target page is loaded or the scroll event is received.

Further, the transmitting of the captured image file may include information about a location and size in the web data area of the captured image file together with the image file in a data packet to transmit the data packet to the settop box.

Advantages

According to the following exemplary embodiments, a bandwidth between a virtualization server and a settop box can be optimized.

According to the following exemplary embodiments, a web browsing service can be provided using a cheap settop box.

DETAILED DESCRIPTION OF THE INVENTION

Figure 1:
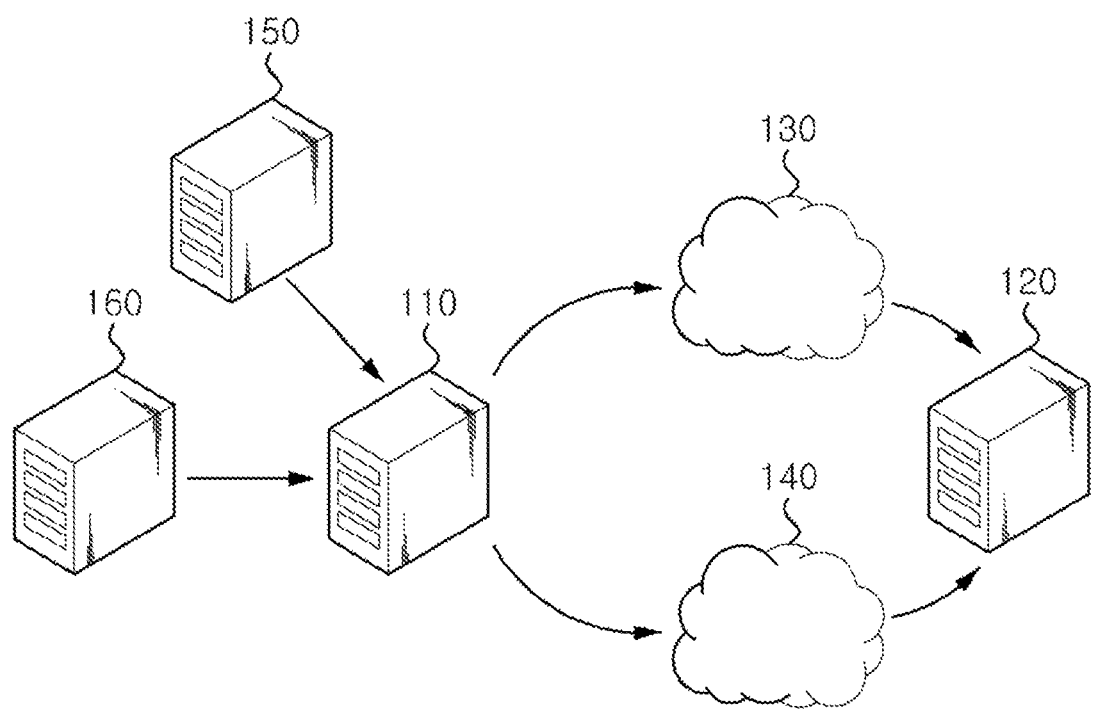
FIG. 1 is a diagram illustrating a virtualization system using a hybrid transmitting protocol according to an exemplary embodiment.

In accordance with an exemplary embodiment, a virtualization server includes a parsing unit that parses a target page received from a web server to divide the target page into a moving picture area in which a moving picture is reproduced and a web data area in which web data are displayed; an encoder that captures the moving picture area to re-encode the moving picture when the moving picture is reproduced; a transcoder that downloads the moving picture and that transcodes the downloaded moving picture; a capture unit that captures a web data area to generate an image file; and a transmitting unit that transmits the captured image file and the re-encoded moving picture to the settop box or that transmits the captured image file and the transcoded moving picture to the settop box, wherein the captured image file is restored at the settop box in order to configure a web data area of the target page, the re-encoded moving picture or the transcoded moving picture is restored at the settop box in order to configure a moving picture area of the target page to constitute the target page at the settop box.

Further, the virtualization server may re-encode the moving picture or may download and transcode the moving picture when a uniform resource locator (URL) of the target page is not included in a list of web pages configured with only a moving picture area but when moving picture reproduction information is included in a DOM tree of the target page.

Further, the web data area may include a plurality of update areas discontinuously located from each other and updated, compared with a previous time point, and the capture unit may capture one quadrangle area including the entire of the plurality of update areas to generate the image file.

Further, the web data area may include a plurality of update areas discontinuously located from each other and updated, compared with a previous time point, and the capture unit may individually capture quadrangle areas corresponding to each of the discontinuous update areas to generate the image file.

Further, the virtualization server may further include a receiving unit that receives a scroll event about the restored target page from the settop box, wherein the capture unit may capture a web data area when the target page is loaded or when the scroll event is received.

Further, the transmitting unit may include information about a location and size in the web data area of the captured image file together with the image file in a data packet and transmit the data packet to the settop box.

In accordance with another exemplary embodiment, a settop box includes an image receiving unit that receives an image file generated by capturing a web data area in which web data are displayed in a target page; a moving picture receiving unit that receives a moving picture re-encoded by capturing a moving picture area in which a moving picture is reproduced in the target page or that receives a moving picture generated by transcoding in the virtualization server; and a target page restoration unit that restores the web data area with the image file and that restores the moving picture area with the re-encoded moving picture or the transcoded moving picture to restore the target page.

Further, the image receiving unit may receive a data packet including information about a location and size in the web data area of the captured image file and the image file, and the target page restoration unit may restore the web data area with the received image file with reference to information about a location and size in the web data area of the captured image file.

Further, the web data area further include a plurality of update areas discontinuously located from each other and updated, compared with a previous time point, and the data packet may include information about a location and size of a plurality of image files generated by individually capturing quadrangle areas corresponding to each of the discontinuous update areas and the plurality of image files.

In accordance with another exemplary embodiment, a method of operating a virtualization server includes parsing a target page received from a web server to divide the target page into a moving picture area in which a moving picture is reproduced and a web data area in which web data are displayed; capturing the moving picture area to re-encode the moving picture or downloading the moving picture to transcode the downloaded moving picture, when the moving picture is reproduced; capturing a web data area to generate an image file; and transmitting the captured image file and the re-encoded moving picture to a settop box or transmitting the captured image file and the transcoded moving picture to a settop box, wherein the captured image file is restored at the settop box in order to configure a web data area of the target page, and the re-encoded moving picture or the transcoded moving picture is restored at the settop box in order to configure a moving picture area of the target page to constitute the target page at the settop box.

Further, the capturing of the moving picture area to re-encode the moving picture or downloading the moving picture to transcode the downloaded moving picture may include re-encoding the moving picture or downloading and transcoding the moving picture when an URL of the target page is not included in a list of web pages configured with only a moving picture area, but when moving picture reproduction information is included in a DOM tree of the target page.

Further, the web data area may include a plurality of update areas discontinuously located from each other and updated, compared with a previous time point, and the capturing of a web data area to generate an image file may include capturing one quadrangle area including the entire of the plurality of update areas to generate the image file.

Further, the web data area may include a plurality of update areas discontinuously located from each other and updated, compared with a previous time point, and the capturing of a web data area to generate an image file may include individually capturing quadrangle areas corresponding to each of the discontinuous update areas to generate the image file.

Further, the method further may include receiving a scroll event of the restored target page from the settop box, wherein the capturing of a web data area to generate an image file may include generating the image file by capturing the web data area when the target page is loaded or the scroll event is received.

Further, the transmitting of the captured image file may include information about a location and size in the web data area of the captured image file together with the image file in a data packet to transmit the data packet to the settop box.

Hereinafter, an exemplary embodiment will be described in detail with reference to the accompanying drawings.

FIG. 1 is a diagram illustrating a virtualization system using a hybrid transmitting protocol according to an exemplary embodiment.

A virtualization server 110 according to an exemplary embodiment receives a uniform resource locator (URL) of a target page from a settop box 120. Here, the target page is a kind of a web page and is a document on Internet in which the settop box 120 is to display through a display device such as a television.

The virtualization server 110 receives a target page from a web server 160. According to an exemplary embodiment, the target page may be divided into a moving picture area in which a moving picture is reproduced and a web data area in which web data such as a text and an image are displayed. A moving picture displayed in the moving picture area is data in which a content or a result displayed on a screen is changed at every time, and when a content of web data such as a text and an image is displayed on a screen, the content is maintained for a relatively long time.

The virtualization server 110 according to an exemplary embodiment may parse a target page to divide the target page into a moving picture area in which a moving picture is reproduced and a web data area in which web data are displayed.

The virtualization server 110 captures a web data area to generate an image file. Further, the virtualization server 110 captures a moving picture area to again encode the captured moving picture area or directly downloads and transcodes a moving picture from a moving picture server 150.

The virtualization server 110 transmits an image file to the settop box 120 through a first communication network 130 and transmits an encoded moving picture or a transcoded moving picture to the settop box 120 through a second communication network 140.

The settop box 120 restores a web data area with an image file and restores a moving picture area using an encoded moving picture or a transcoded moving picture. Because the settop box 120 has a CPU of a low performance, it may be difficult to directly render and display an interactive web page such as HTML5. However, the virtualization server 110 performs a function of complex parsing or processing a heavy code of a web page, and the settop box 120 processes only a capture image of a result screen thereof, thereby providing a smooth browsing service to a user in spite of a low performance.

Further, because the settop box 120 has a hardware decoding chip for reproducing a moving picture, the settop box 120 may decode an encoded moving picture or a transcoded moving picture in spite of a low performance.

Therefore, the settop box 120 may provide a smooth browsing service to a web page including a moving picture.

Figure 2:
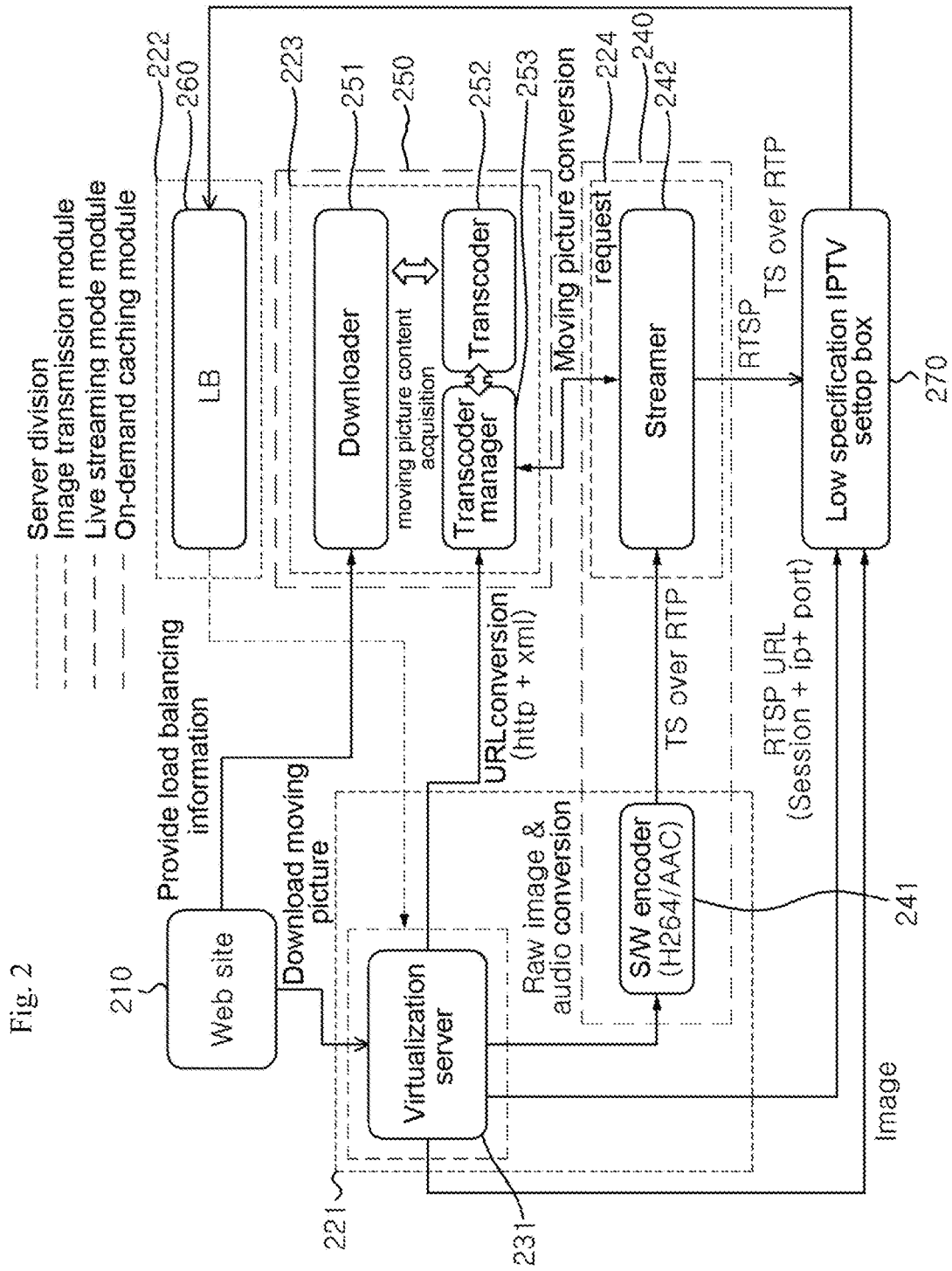
FIG. 2 is a block diagram illustrating a configuration of an IPTV system using a hybrid transmitting protocol according to an exemplary embodiment.

FIG. 2 is a block diagram illustrating a configuration of an IPTV system using a hybrid transmitting protocol according to an exemplary embodiment. The IPTV system according to an exemplary embodiment may include a virtualization server 231, an S/W encoder 241, a streamer 242, a downloader 251, a transcoder 252, and a transcoder manager 253.

FIG. 2 illustrates an exemplary embodiment in which constituent elements of an IPTV system are configured with an individual server, but according to another exemplary embodiment, the entire of the S/W encoder 241, the streamer 242, the downloader 251, the transcoder 252, and the transcoder manager 253 may be implemented with S/W within the virtualization server 231.

Alternatively, the virtualization server 231 and the S/W encoder 241 may configure one server 221, the streamer 242 may configure another server 224, the downloader 251, the transcoder 252, and the transcoder manager 253 may configure another server 223, and a load balance 260 may configure another server 222.

The virtualization server 231 receives and parses a target page to divide the target page into a moving picture area and a web data area.

An image transmission module 240 may perform a processing of a web data area. The image transmission module 240 may include a virtualization server 231. The virtualization server 231 may capture an updated area in a web data area to generate an image file and transmit the generated image file to a settop box 270.

The live streaming mode module 240 or an on-demand caching module 250 may perform a processing of a moving picture area. Here, the live streaming mode module 240 is a module that performs a hybrid live streaming transmission mode, which is a kind of a hybrid transmitting protocol, and the on-demand caching module 250 is a module that performs a hybrid on-demand streaming transmission mode, which is a kind of a hybrid transmitting protocol.

The live streaming mode module 240 may include an S/W encoder 241 and a streamer 242. The S/W encoder 241 captures and encodes a moving picture area updated according to play of a moving picture. The streamer 242 may transmit an encoded moving picture to the settop box 270.

The on-demand caching module 250 may include a downloader 251, a transcoder 252, and a transcoder manager 253. The downloader 251 downloads a moving picture included in a target page, and the transcoder 252 may transcode a downloaded moving picture in a form in which the settop box 270 may easily reproduce. The transcoder manager 253 determinates a format of the downloaded moving picture and instructs the transcoder 252 to transcode and transformat.

The load balance 260 monitors a CPU use amount of the settop box 270 and reports a monitored result to the virtualization server 231 to enable the virtualization server 231 to change a transmitting method of a hybrid transmitting protocol.

Figure 3:
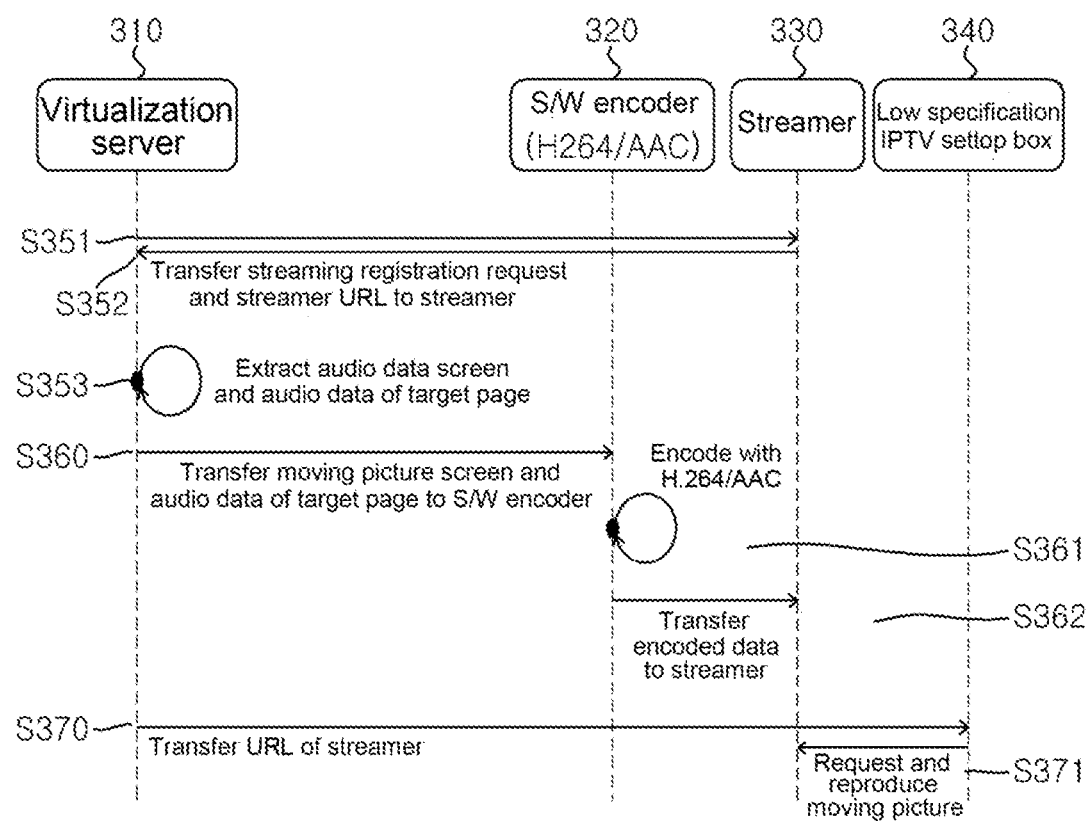
FIG. 3 is a flowchart illustrating a hybrid live streaming transmission mode on a step basis according to an exemplary embodiment.

FIG. 3 is a flowchart illustrating a hybrid live streaming transmission mode on a step basis according to an exemplary embodiment. The hybrid live streaming transmission mode is a mode that re-encodes a moving picture area to transmit the re-encoded moving picture to a settop box 340.

A virtualization server 310 transfers a streaming registration request and a streamer URL to a streamer 330 (step S351).

The streamer 330 transmits a determination message to the virtualization server 310 (step S352).

The virtualization server 310 extracts audio data and a moving picture area of a target page (step S353). According to an exemplary embodiment, the virtualization server 310 may capture an area in which a moving picture is displayed at the target page to extract a moving picture area.

The virtualization server 310 transfers a moving picture area and audio data extracted at the target page to an S/W encoder 320 (step S360).

The S/W encoder 320 encodes a moving picture area and audio data in a form in which the settop box 340 may easily reproduce the moving picture area and the audio data using a hardware decoder (step S361). According to an exemplary embodiment, the S/W encoder may encode a moving picture area and audio data in a H.264/AAC form.

The S/W encoder 320 may transfer the encoded data to the streamer 330 (step S362).

The virtualization server 310 may transfer an URL of the streamer 330 to the settop box 340 (step S370).

The settop box 340 may transmit a moving picture streaming request to the streamer 330 (step S371). The streamer 330 may stream the encoded moving picture to the settop box 340, and the settop box 340 may reproduce the streamed moving picture using a hardware decoding chip provided therein.

Although not described with reference to FIG. 3, the virtualization server 310 may transmit an image file encoded by capturing a web data area to the settop box 340. In this case, the settop box 340 restores a web data area with an image file and restores a moving picture area with the encoded moving picture to reconfigure a target page.

Figure 4:
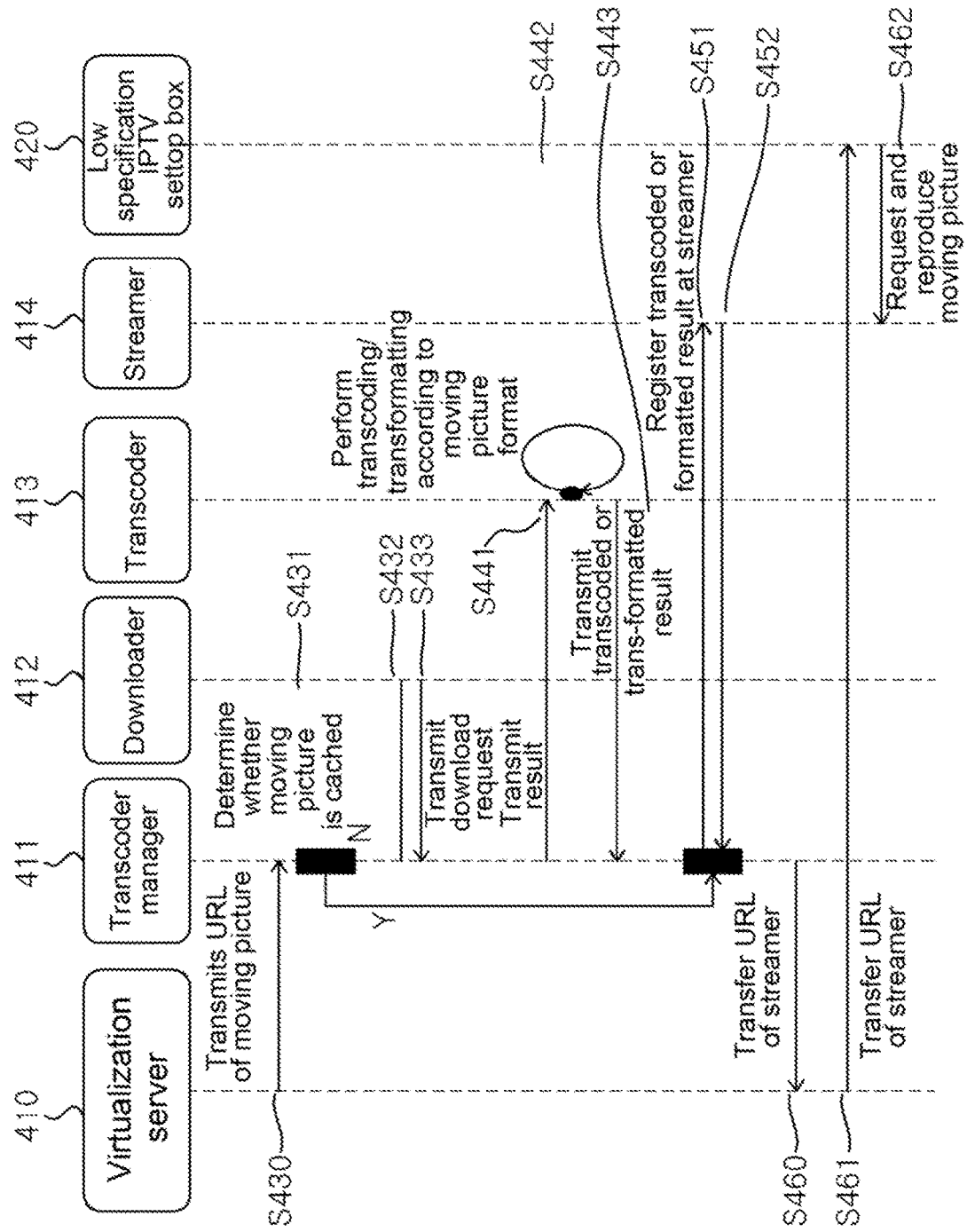
FIG. 4 is a flowchart illustrating a hybrid on-demand streaming transmission mode on a step basis according to an exemplary embodiment.

FIG. 4 is a flowchart illustrating a hybrid on-demand streaming transmission mode on a step basis according to an exemplary embodiment. The hybrid on-demand streaming transmission mode is a mode that downloads and transcodes a moving picture included in a moving picture area to transmit the moving picture to a settop box 420.

A virtualization server 410 transmits an URL of a moving picture included in a moving picture area to a transcoder manager 411 (step S430).

The transcoder manager 411 determines whether a corresponding moving picture is cached at a storage device (step S431). If a corresponding moving picture caches at a storage device, the transcoder manager 411 may transfer the moving picture cached at step S431 to a streamer 414.

If a corresponding moving picture is not cached at a storage device, the transcoder manager 411 transmits a download request for a corresponding moving picture to a downloader 412 (step 432).

The downloader 412 downloads the corresponding moving picture and transmits a result thereof to the transcoder manager 411 (step S433).

The transcoder manager 411 requests to transcode a corresponding moving picture in a form in which the settop box 420 may easily reproduce using a hardware decoding chip to a transcoder 413 (step S441).

The transcoder 413 performs a transcoding or transformatting work of a corresponding moving picture (step S442).

The transcoder 413 transmits a transcoded or trans-formatted result to the transcoder manager 411 (step S443).

The transcoder manager 411 registers a transcoded or formatted result at the streamer 414 and caches the registered result at a disk (step S451).

The streamer 414 transmits a registered result to the transcoder manager 411 (step S452).

The transcoder manager 411 may transfer an URL of the streamer 414 to the virtualization server 410 (step S460).

The virtualization server 410 may transfer an URL of the streamer 414 to the settop box 420 (step S461).

The settop box 420 may transmit a moving picture streaming request to the streamer 414 (step S462). The streamer 414 streams a transcoded or formatted moving picture to the settop box 420, and the settop box 420 may reproduce a streamed moving picture using a hardware decoding chip provided therein.

Although not described with reference to FIG. 4, the virtualization server 410 may transmit an image file encoded by capturing a web data area to the settop box 420. In this case, the settop box 420 may restore a web data area with the image file and restore a moving picture area with a transcoded or trans-formatted moving picture to reconfigure a target page.

Figure 5:
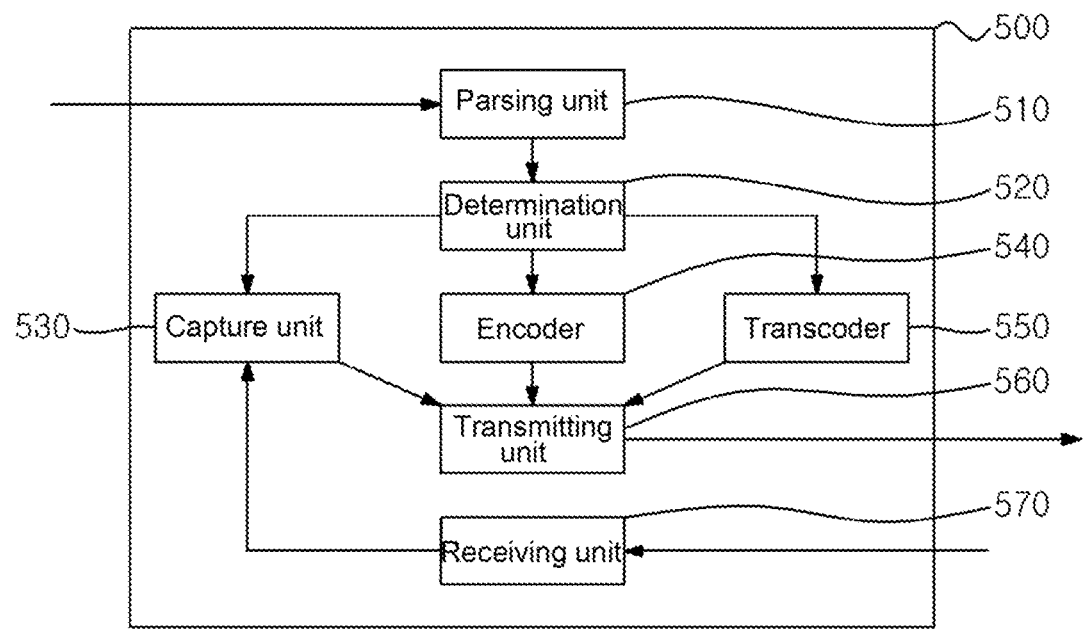
FIG. 5 is a block diagram illustrating a structure of a virtualization server according to an exemplary embodiment.

FIG. 5 is a block diagram illustrating a structure of a virtualization server according to an exemplary embodiment. A virtualization server 500 according to an exemplary embodiment may include a parsing unit 510, a determination unit 520, a capture unit 530, an encoder 540, a transcoder 550, a transmitting unit 560, and a receiving unit 570.

The parsing unit 510 parses a target page received from a web server to divide the target page into a moving picture area in which a moving picture is reproduced and a web data area in which web data are displayed.

The determination unit 520 determines a protocol for transmitting the target page to the settop box. Alternatively, even after a protocol is determined, the determination unit 520 may change a protocol in consideration of a change in a bandwidth of a communication network from the virtualization server 500 to the settop box and an attribute change of a moving picture included in a moving picture area.

Hereinafter, a configuration in which the determination unit 520 determines a protocol will be described in detail with reference FIG. 6.

Figure 6:
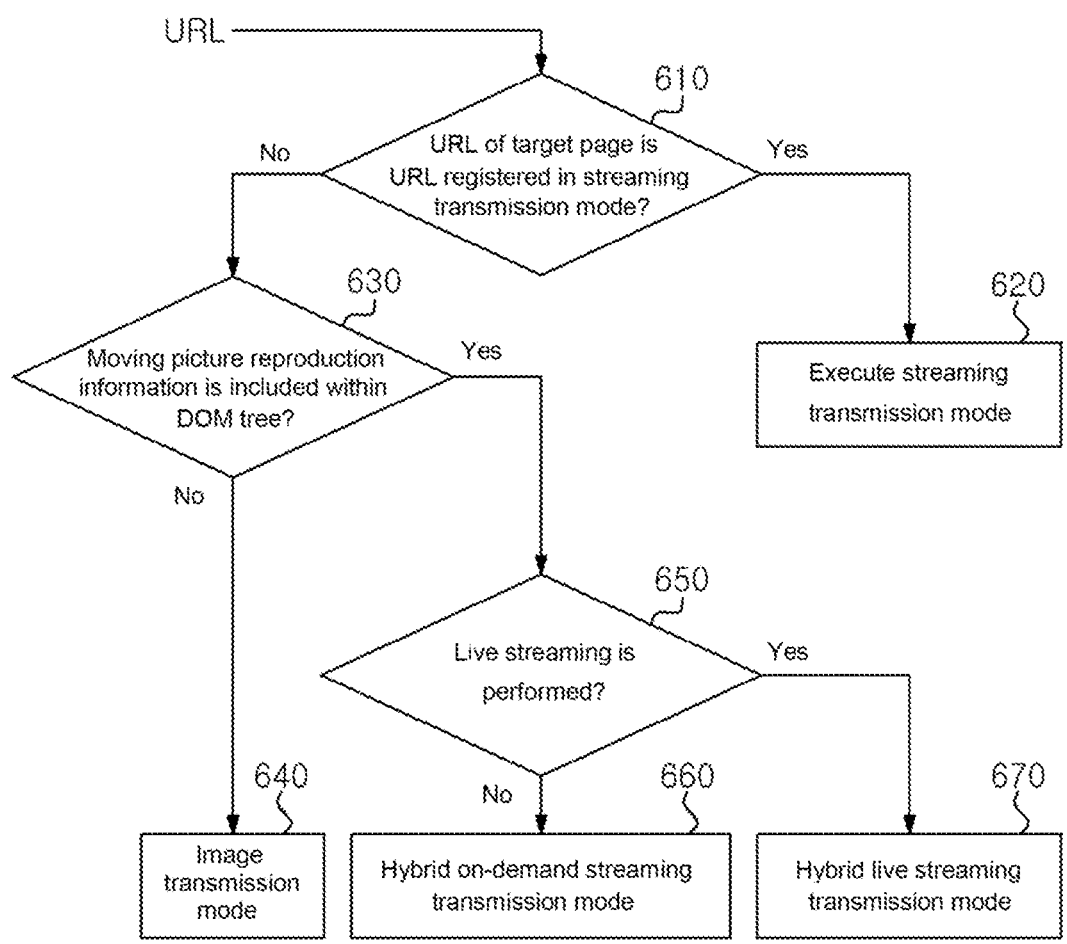
FIG. 6 is a flowchart illustrating a method of converting a transmission mode on a step basis according to an exemplary embodiment.

FIG. 6 is a flowchart illustrating a method of converting a transmission mode on a step basis according to an exemplary embodiment.

The determination unit 520 receives an URL of a target page and determines whether the URL of the target page is an URL registered in a streaming transmission mode (step 610). Here, an URL registered in a streaming transmission mode means an URL of web pages that do not include web data and in which a moving picture is reproduced on an entire screen.

If an URL of the target page is an URL registered in a streaming transmission mode, a moving picture included in the target page is reproduced in an entire screen mode. Therefore, in this case, the determination unit 520 determines to execute a streaming transmission mode in which a moving picture is directly streamed from the moving picture server to the settop box (step 620).

If an URL of the target page is not an URL registered in a streaming transmission mode, the target page is a web page including only web data or including both web data and moving picture data.

In this case, the determination unit 520 determines whether moving picture reproduction information is included within a DOM tree of the target page (step 630). According to an exemplary embodiment, the moving picture reproduction information may be a VIDEO tag of HTML5. If moving picture reproduction information is included within a DOM tree of the target page, the determination unit 520 may determine that the target page includes a moving picture.

If moving picture reproduction information is not included within a DOM tree of the target page, the determination unit 520 may determine that the target page is a web page including only web data. In this case, the determination unit 520 may determine to execute an image transmission mode that captures and transmits an entire web page with an image (step 640).

If moving picture reproduction information is included within a DOM tree of the target page, the determination unit 520 may determine whether to perform live streaming (step 650).

If live streaming should be performed, the determination unit 520 may determine to execute a hybrid live streaming transmission mode (step 670).

If live streaming is not performed, the determination unit 520 may determine to execute a hybrid on-demand streaming transmission mode (step 660).

The hybrid live streaming transmission mode and the hybrid on-demand streaming transmission mode have been described with reference to FIGS. 2 and 3.

When a moving picture included in the target page is reproduced, the encoder 540 captures a moving picture area and re-encodes a moving picture.

The transcoder 550 downloads the moving picture in the target page and transcodes or trans-formats the downloaded moving picture.

The capture unit 530 captures a web data area in the target page to generate an image file. According to an exemplary embodiment, the capture unit 530 may capture only an updated portion in the web data area in consideration of a bandwidth between the virtualization server 500 and the settop box. A configuration in which the capture unit 530 captures a web data area will be described in detail with reference to FIG. 7.

Figure 7:
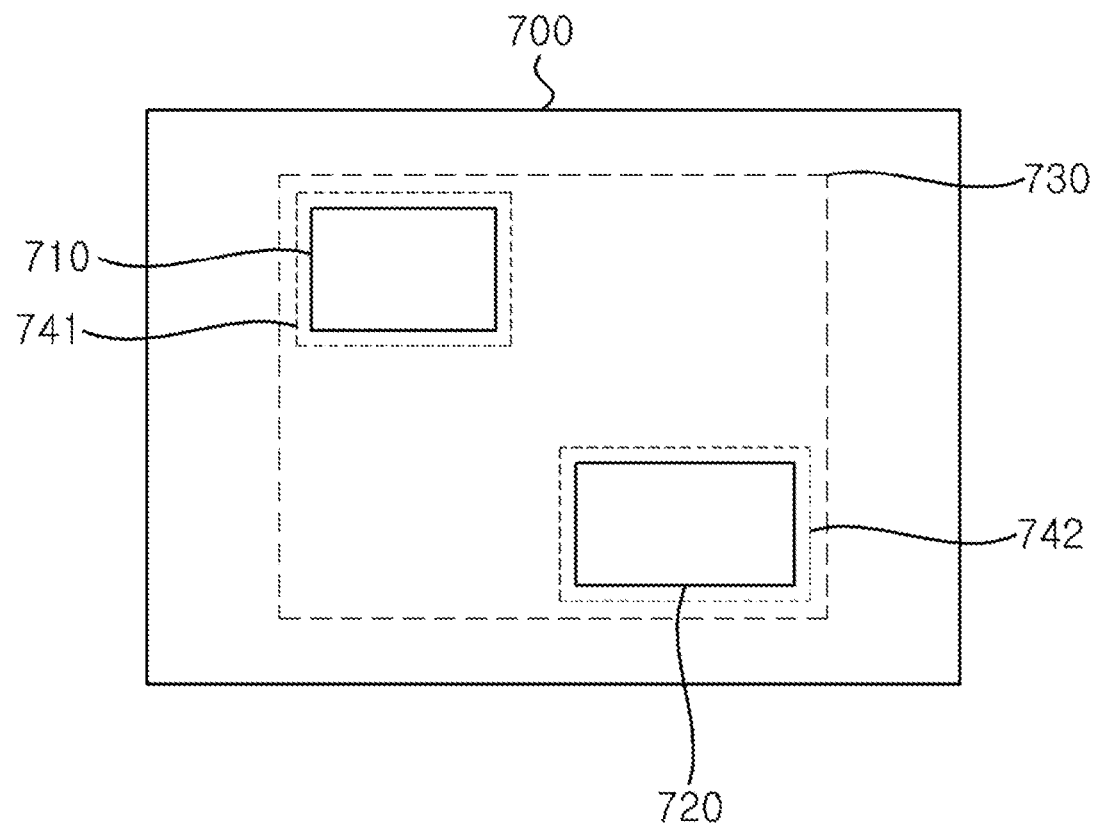
FIG. 7 is a diagram illustrating capture of a web data area according to an exemplary embodiment.

FIG. 7 is a diagram illustrating capture of a web data area according to an exemplary embodiment.

A web data area 700 is an area in which the same result is maintained for a relatively long period even after a text or an image is displayed on a screen in a target page. However, the web data area 700 is sequentially updated. Therefore, the capture unit 530 captures a web data area, and the transmitting unit 560 transmits a captured image to the settop box to enable the settop box to reflect a change of the target page.

In the web data area 700, only partial areas 710 and 720 may be updated. In FIG. 7, two areas 710 and 720 are updated, and the two areas 710 and 720 are discontinuous.

According to an exemplary embodiment, the capture unit 530 may capture areas 710 and 720 updated using several capture methods. Hereinafter, each method will be described.

1. Buffer Clear

In a buffer clear method, areas 710 and 720 each are captured in which a screen change has occurred regardless of a capture interval. In the buffer clear method, because only areas 741 and 742 corresponding to the changed areas 710 and 720 are captured, the buffer clear method is efficient, but when a so fast screen change occurs, there is a problem that the settop box cannot appropriately render an image transmitted from the virtualization server.

2. Rect-Merge Method

In the Rect-Merge method, by capturing one quadrangle area 730 including changed entire areas 710 and 720 for a predetermined capture interval, an image file is generated. Because capture is performed at every predetermined capture interval, there is a merit that a load of a virtualization server and a settop box may be reduced. However, because capture of an area that is not changed is performed, there is a drawback that a band between the virtualization server and the settop box is waste.

3. Region-Merge Method

In the Region-Merge method, by capturing a plurality of quadrangle areas 741 and 742 individually including areas 710 and 720 changed for a predetermined capture interval, an image file is generated. Because capture is performed at every predetermined capture interval, a load of the virtualization server and the settop box can be reduced, and because only capture of the changed areas 710 and 720 is performed, a band between the virtualization server and the settop box can be efficiently used.

4. Buffer-Mirror Method

The Buffer-Mirror method is a method of capturing an entire target page regardless of whether a screen is updated. The Buffer-Mirror method performs capture at every predetermined capture interval.

The receiving unit 570 may receive several events from the settop box. Further, the capture unit 530 may control a capture time point according to an event received by the receiving unit 570. Hereinafter, a configuration that controls a capture time point according to an event received from the settop box will be described with reference to FIG. 8.

Figure 8:
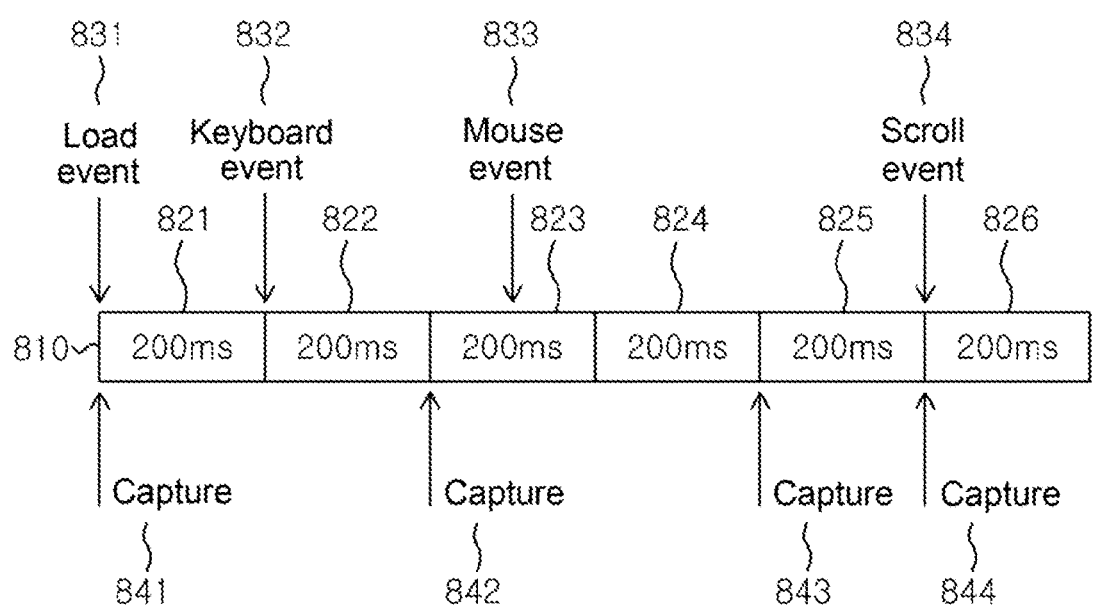
FIG. 8 is a diagram illustrating a capture time point on an event kind basis according to an exemplary embodiment.

FIG. 8 is a diagram illustrating a capture time point on an event kind basis according to an exemplary embodiment.

The capture unit 530 performs capture at every predetermined capture interval. FIG. 8 illustrates an exemplary embodiment in which a capture interval is 400 ms.

When a target page restored from a captured image and a re-encoded or transcoded moving picture is loaded at the settop box, the receiving unit 570 may receive a load event 831 from the settop box. In this case, the capture unit 530 may notify a user that a work is currently performed by performing capture 841 while receiving an event.

When the user manipulates a mouse and a keyboard connected to the settop box, the receiving unit 570 may receive a mouse event 833 and a keyboard event 832 from the settop box. The mouse event 833 and the keyboard event 832 are events having a high possibility in which additional rendering is to occur. Therefore, the capture unit 530 performs capture 842 and 843 at a delayed time point, and a text input using a keyboard may be transmitted at one time by configuring a separate UI at the settop box.

When the user scrolls a screen of the settop box, the receiving unit 570 may receive a scroll event 834 from the settop box. Because the scroll event moves an already rendered result screen, the capture unit 530 immediately performs capture 844.

When transmitting in a hybrid live streaming mode, the transmitting unit 560 transmits a captured image file and a re-encoded moving picture to the settop box. Further, when transmitting in a hybrid on-demand mode, the transmitting unit 560 transmits a captured image file and a transcoded moving picture to the settop box.

According to an exemplary embodiment, the transmitting unit 560 may include information about a location in a web data area of a captured image file and a size of an image file in a data packet together with the image file and transmit the data packet to the settop box.

Figure 9:
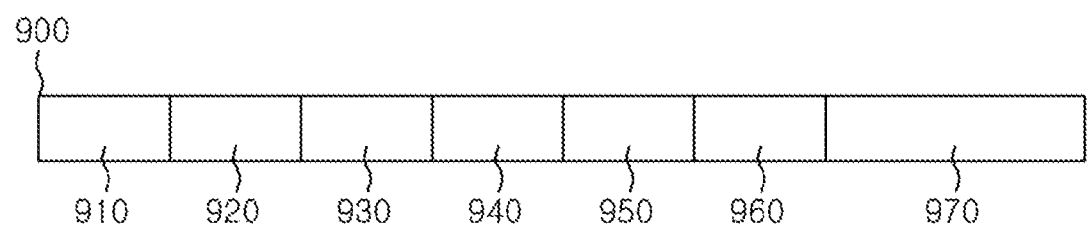
FIG. 9 is a diagram illustrating a structure of a data packet according to an exemplary embodiment.

FIG. 9 is a diagram illustrating a structure of a data packet according to an exemplary embodiment.

A data packet 900 may include a protocol type 910, time information 920, a header size 930, header data 940, a body size 950, body information 960, and body data 970.

The protocol type 910 may include information about a method of capturing an image. For example, when a capture method is a Buffer-Mirror method, 'A' may be included in the protocol type 910, when a capture method is a Buffer-Clear method, 'B' may be included in the protocol type 910, when a capture method is a Rect-Merge method, 'C' may be included in the protocol type 910, and when a capture method is a Region-Merge method, 'D' may be included in the protocol type 910.

The time information 920 includes time information in which a server initially receives a request signal sent from a data receiving device. The time information may be used for checking a response time.

The header size 930 includes information about a size of the header data 940.

The header data 940 include information about a central processing unit (CPU), a memory, and heap of the virtualization server.

The body size 950 includes information about a size of body data 960.

The body information 960 includes information about an area captured by the virtualization server and information about the number of captured images when partial capture is performed.

The body data 970 include an image captured using each capture type.

When transmitting in a hybrid live streaming mode, the settop box may restore a web data area with an image file and restore a moving picture area with an encoded moving picture to reconfigure a target page.

When transmitting in a hybrid on-demand mode, the settop box 420 may restore a web data area with an image file and restore a moving picture area with a transcoded or trans-formatted moving picture to reconfigure a target page.

Figure 10:
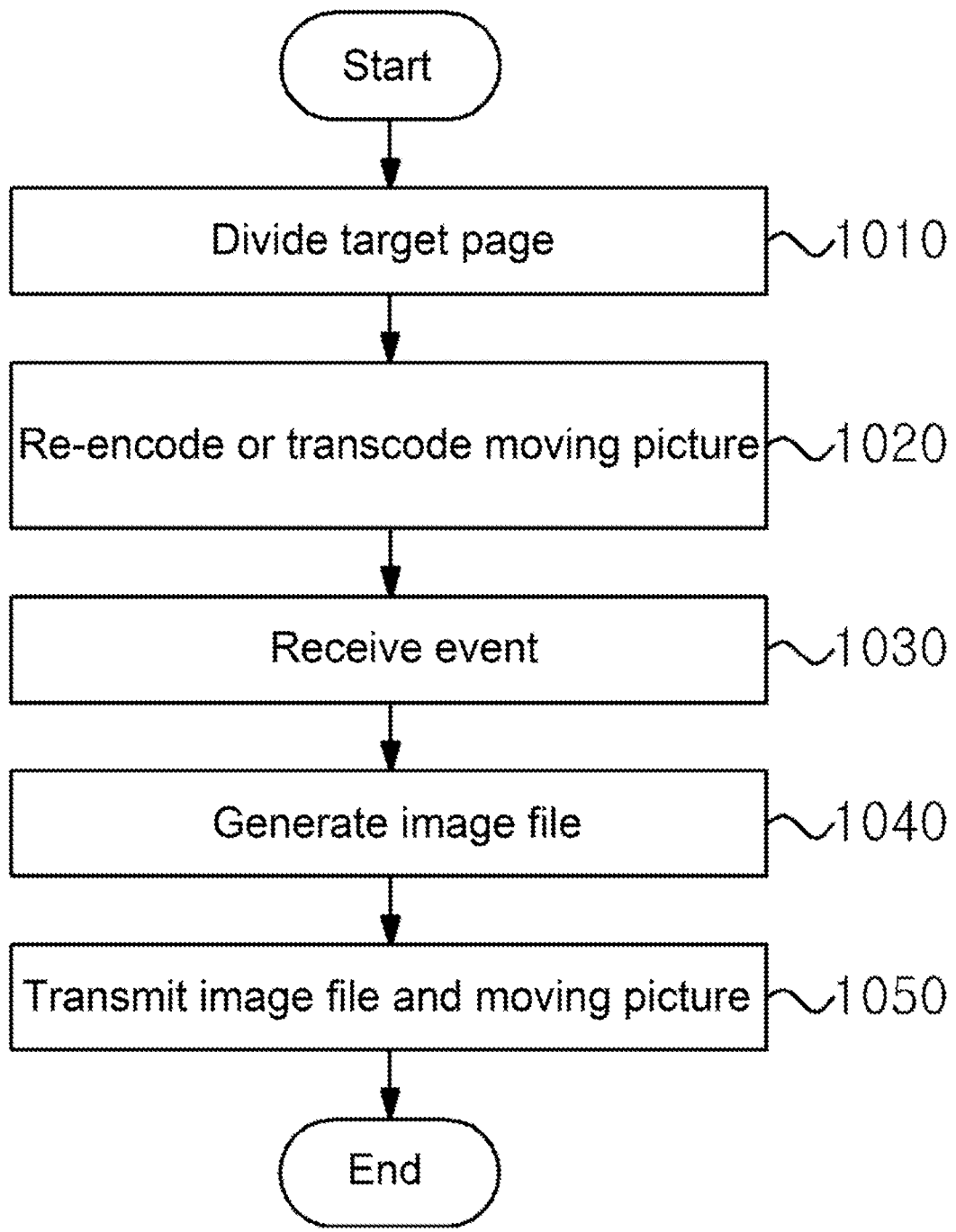
FIG. 10 is a flowchart illustrating a method of operating a virtualization server on a step basis according to an exemplary embodiment.

FIG. 10 is a flowchart illustrating a method of operating a virtualization server on a step basis according to an exemplary embodiment.

The virtualization server receives and parses a target page and divides the target page into a web data area in which web data are displayed and a moving picture area in which a moving picture is displayed (step 1010).

The virtualization server captures a moving picture area and re-encodes or downloads the moving picture, and transcodes the downloaded moving picture (step 1020). According to an exemplary embodiment, when an URL of a target page is not included in a list of web pages configured only with a moving picture area and when moving picture reproduction information is included in DOM tree of a target page, the virtualization server re-encodes or downloads the moving picture to transcode the moving picture.

The virtualization server receives an event from the settop box (step 1030). The virtualization server may control a time point that captures a web data area according to an event received from the settop box. For example, when an event received from the settop box is a scroll event of a target page restored at the settop box or a load event that loads a target image restored at the settop box, the virtualization server may immediately capture a web data area. However, when an event received from the settop box is a mouse event or a keyboard event in which a user of the settop box manipulates a mouse and a keyboard, the virtualization server may stand by to a predetermined capture time point and perform capture.

The virtualization server captures a web data area to generate an image file (step 1040). According to an exemplary embodiment, the virtualization server may perform capture using any one method of several capture methods described with reference to FIG. 7. For example, when a plurality of update areas discontinuously located from each other and updated, compared with a previous time point are included in a web data area, the virtualization server may capture one quadrangle area including the entire of the plurality of update areas to generate an image file. Alternatively, by individually capturing quadrangle areas corresponding to each of discontinuous update areas, the virtualization server may generate an image file.

The virtualization server may transmit an image file and a moving picture to the settop box (step 1050). When transmitting in a hybrid live streaming mode, the virtualization server may transmit the captured image file and the re-encoded moving picture to the settop box. When transmitting in a hybrid on-demand mode, the virtualization server may transmit the captured image file and the transcoded moving picture to the settop box.

According to an exemplary embodiment, the virtualization server may include information about a location and size in a web data area of the captured image file together with the image file in a data packet and transmit the data packet to the settop box (step 1050).

In order to configure a web data area of a target page, the captured image file is restored at the settop box and in order to configure a moving picture area of a target page, the re-encoded moving picture or the transcoded moving picture is restored at the settop box. The settop box may configure a target page using the restored web data area and moving picture area.

Figure 11:
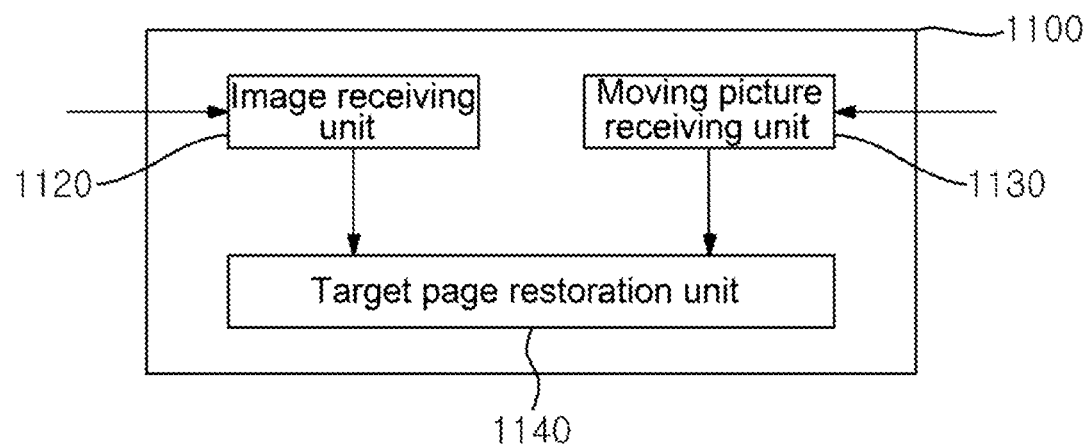
FIG. 11 is a block diagram illustrating a structure of a settop box according to an exemplary embodiment.

FIG. 11 is a block diagram illustrating a structure of a settop box according to an exemplary embodiment. The settop box according to an exemplary embodiment includes an image receiving unit 1120, a moving picture receiving unit 1130, and a target page restoration unit 1140.

The image receiving unit 1120 receives a data packet from the virtualization server. The data packet may include an image file that captures a web data area and information about a location and a size in a web data area of the image file.

Here, the web data area may include a plurality of update areas discontinuously located from each other and updated, compared with a previous time point. In this case, the data packet may include a plurality of image files and information about a location and a size of a plurality of image files generated by individual capturing quadrangle areas corresponding to each of discontinuous update areas. Alternatively, the data packet may include one image file and information about a location and a size of one image file generated by capturing one quadrangle area including the entire of discontinuous update areas.

The moving picture receiving unit 1130 may receive a moving picture re-encoded by capturing a moving picture area or may receive a moving picture in which a corresponding moving picture is downloaded from the virtualization server to be transcoded.

The target page restoration unit 1140 may restore a web data area with an image file and restore a moving picture area with a re-encoded moving picture or a transcoded moving picture to restore the target page. Here, the target page restoration unit 1140 may restore a web data area with a received image file with reference to information about a location and a size in a web data area of a captured image file.

Methods according to an exemplary embodiment may be implemented into a program command form that may be performed through various computer means to be recorded in a computer readable medium. The computer readable medium may include a program command, a data file, and a data structure in single or in combination. The program command recorded at the medium may be specially designed and configured for an exemplary embodiment or may be known to and used by a person of ordinary skill in the computer software. The computer readable recording medium may include, for example, magnetic media such as a hard disk, a floppy disk, and a magnetic tape, optical media such as a Compact Disk Read-Only Memory (CD-ROM) or a Digital Versatile Disk (DVD), magnetic-optical media such as a floptical disk, and a hardware device, specially configured to store and execute a program command, such as a ROM, a Random-Access Memory (RAM), and a flash memory. The program command may include, for example, a high-level language code that may be executed by a computer using an interpreter as well as a machine language code formed by a compiler. In order to perform operation of an exemplary embodiment, the above-described hardware device may be configured to operate as at least one software module and vice versa.

Although exemplary embodiments have been described in detail hereinabove, it should be clearly understood that many variations and modifications of the basic inventive concepts herein described, which may appear to those skilled in the art, will still fall within the spirit and scope of the exemplary embodiments of the present disclosure as defined in the appended claims. For example, even if described technologies are performed in order different from a described method, and/or constituent elements such as a described system, structure, device, and circuit are coupled or combined in a form different from that of a described method, or are replaced or substituted with another constituent element or equivalent, an appropriate result can be achieved.

Therefore, other implementations, other exemplary embodiments, and equivalents to claims will still fall within the spirit and scope of the appended claims.

INDUSTRIAL APPLICABILITY

A hybrid protocol is provided that can provide a web browsing service even when using a settop box of a low performance by using a virtualization server. The virtualization server separately encodes an area in which a moving picture is reproduced in a target page or transcodes a corresponding moving picture to transmit the moving picture to the settop box. Further, the virtualization server captures an area in which web data are displayed into a picture file and transmits the captured picture file to the settop box. The settop box reproduces a moving picture using a hardware decoding chip and restores a target page with the picture file using a CPU of a low performance.

What is claimed is:

1. A virtualization server, comprising:
 a parsing unit that parses a target page received from a web server to divide the target page into a moving picture area in which a moving picture is reproduced and a web data area in which web data are displayed;
 an encoder that captures the moving picture area to re-encode the moving picture when the moving picture is reproduced;
 a transcoder that downloads the moving picture and that transcodes the downloaded moving picture;
 a capture unit that captures the web data area to generate an image file; and
 a transmitting unit that operates in a first transmission mode for transmitting the captured image file and the re-encoded moving picture to a settop box or in a second transmission mode for transmitting the captured image file and the transcoded moving picture to the settop box, when an uniform resource locator (URL) of the target page is not included in a list of web pages configured with only a moving picture area but when moving picture reproduction information is included in a document object model (DOM) tree of the target page, wherein the captured image file is restored at the settop box in order to configure the web data area of the target page, wherein the re-encoded moving picture or the transcoded moving picture is restored at the settop box in order to configure a moving picture area of the target page to constitute the target page at the settop box, and wherein the virtualization server operates in either the first transmission mode or the second transmission mode according to a CPU use amount of the settop box.

2. The virtualization server of claim 1, wherein the web data area comprises a plurality of update areas discontinuously located from each other and updated, compared with a previous time point, and the capture unit captures one quadrangle area comprising the entire of the plurality of update areas to generate the image file.

3. The virtualization server of claim 1, wherein the web data area comprises a plurality of update areas discontinuously located from each other and updated, compared with a previous time point, and the capture unit individually captures quadrangle areas corresponding to each of the discontinuous update areas to generate the image file.

4. The virtualization server of claim 1, further comprising a receiving unit that receives a scroll event about the restored target page from the settop box, wherein the capture unit captures the web data area when the target page is loaded or when the scroll event is received.

5. The virtualization server of claim 1, wherein the transmitting unit comprises information about a location and size in the web data area of the captured image file together with the image file in a data packet and transmits the data packet to the settop box.

6. A settop box, comprising:

an image receiving unit that receives an image file generated by capturing a web data area in which web data are displayed in a target page;

a moving picture receiving unit that operates in a first receiving mode for receiving a moving picture re-encoded by capturing a moving picture area in which a moving picture is reproduced in the target page or in a second receiving mode for receiving a moving picture generated by transcoding in the virtualization server, when an uniform resource locator (URL) of the target page is not included in a list of web pages configured with only a moving picture area but when moving picture reproduction information is included in a document object model (DOM) tree of the target page; and a target page restoration unit that restores the web data area with the image file and that restores the moving picture area with the re-encoded moving picture or the transcoded moving picture to restore the target page, wherein the moving picture receiving unit operates in either the first receiving mode or the second receiving mode according to a CPU use amount of the settop box.

7. The settop box of claim 6, wherein the image receiving unit receives a data packet comprising information about a location and size in the web data area of the captured image file and the image file, and the target page restoration unit restores the web data area with the received image file with reference to information about a location and size in the web data area of the captured image file.

8. The settop box of claim 7, wherein the web data area comprises a plurality of update areas discontinuously located from each other and updated, compared with a previous time point, and the data packet comprises information about a location and size of a plurality of image files generated by individually capturing quadrangle areas corresponding to each of the discontinuous update areas and the plurality of image files.

9. A method of operating a virtualization server, the method comprising:

parsing a target page received from a web server to divide the target page into a moving picture area in which a moving picture is reproduced and a web data area in which web data are displayed;

capturing the moving picture area to re-encode the moving picture or downloading the moving picture to transcode the downloaded moving picture, when the moving picture is reproduced;

capturing the web data area to generate an image file;

determining either a first transmission mode for transmitting the captured image file and the re-encoded moving picture to a settop box or a second transmission mode for transmitting the captured image file and the transcoded moving picture to the settop box, according to a CPU use amount of the settop box that receives and displays the re-encoded moving picture or the transcoded moving picture, when an uniform resource locator (URL) of the target page is not included in a list of web pages configured with only a moving picture area but when moving picture reproduction information is included in a document object model (DOM) tree of the target page; and transmitting the captured image file and the re-encoded moving picture to the settop box or transmitting the captured image file and the transcoded moving picture to the settop box by operating the determined transmission mode, wherein the captured image file is restored at the settop box in order to configure the web data area of the target page, and the re-encoded moving picture or the transcoded moving picture is restored at the settop box in order to configure a moving picture area of the target page to constitute the target page at the settop box.

10. The method of claim 9, wherein the web data area comprises a plurality of update areas discontinuously located from each other and updated, compared with a previous time point, and the capturing of the web data area to generate an image file comprises capturing one quadrangle area comprising the entire of the plurality of update areas to generate the image file.

11. The method of claim 9, wherein the web data area comprises a plurality of update areas discontinuously located from each other and updated, compared with a previous time point, and the capturing of the web data area to generate an image file comprises individually capturing quadrangle areas corresponding to each of the discontinuous update areas to generate the image file.

12. The method of claim 9, further comprising receiving a scroll event of the restored target page from the settop box, wherein the capturing of the web data area to generate an image file comprises generating the image file by capturing the web data area when the target page is loaded or the scroll event is received.

13. The method of claim 9, wherein the transmitting of the captured image file comprises comprising information about a location and size in the web data area of the captured image file together with the image file in a data packet to transmit the data packet to the settop box.

14. A non-transitory computer readable recording medium in which a program for executing the method of claim 9 is recorded.

\* \* \* \* \*